Patented July 11, 193

2,165,837

UNITED STATES PATENT OFFICE 2,165,837

MODIFIED PROTEIN AND METHOD OF PRODUCING THE SAME

Robert D. Coghill, New Haven, Conn., assignor to Parke, Davis & Company, Detroit, Mich., a corporation of Michigan No Drawing. Application May 8, 1933, Serial No. 670,033. Renewed December 13, 1938

5 Claims. Cl. 167—78)

The invention relates to the production of modified proteins used in the treatment of diseases, such for instance as antitoxins and other antiserums. It is the object of the invention to eliminate from such bodies certain undesirable characteristics. More particularly, it is an object to so treat an antiserum or other protein that when injected into an animal it will not lead to the production of antibodies specific for this protein. For instance, with proteins of multiple specificity, such as antiserums, it is the object to destroy one specificity, viz: that of the horse or other animal body in which the product was originally developed.

Generally described, the process for obtaining the improved product consists in the introduction at some point during the usual purification process of the protein, of an enzymic digestion which destroys that portion of the protein molecule which is responsible for its specificity. These enzymes are in general non-proteolytic enzymes which may be prepared from certain of the lower forms of life, such as bacteria, molds and yeasts.

A specific use of my improved process is in the production of diphtheria antitoxin as follows:

Commercial diphtheria antitoxin is diluted with eight volumes of water and enough hydrochloric acid added to bring the pH to within a range of 4.0 to 7.0. A cell extract capable of destroying the specific protein or fraction of protein is then added, as for instance, an enzyme prepared from the mold aspergillus oryzae. Incubation is carried on for several hours within a temperature range of 25° C. to 50° C. At the conclusion of this treatment, the liquor is filtered from any precipitate which may have formed, and the antitoxin put through the usual purification procedure. It will be found that the purified material retains its ability to combine specifically with diphtheria toxin, but has lost all or nearly all of its ability to induce formation of antibodies specific for horse protein. The treatment has thus destroyed one of the specificities of the original antitoxin.

The chief advantage of a protein prepared in this manner is that it can be injected into an animal without arousing specific antibody formation against itself. This will eliminate the danger of anaphylactic shock and serum sickness which is at present connected with the use of antiserums.

It will also make available for medical use proteins which at present are not used because of the danger of specifically sensitizing the patient by as little as only one injection.

While I have described only one specific use of my process and only one improved product, viz: diphtheria antitoxin free from the specificity of the horse, it is obvious that the process has many other applications in the production of various other antiserums and proteins, all of which have the general characteristic of being free from some predetermined detrimental specificity.

What I claim as my invention is:

1. In a process for manufacture of antiserums, the step of treating the antiserum with a non-proteolytic enzyme to cause enzymic digestion and the destruction of a predetermined specificity.

2. In a process of manufacture of antiserums, the step of treating an antiserum with a non-proteolytic enzyme prepared from the mold aspergillus oryzae to cause enzymic digestion and the destruction of a predetermined specificity.

3. In a process of manufacture of antiserums, the steps of diluting diphtheria antitoxin obtained from the blood serum of a horse and acidifying the same to bring the pH within a range of 4.0 to 7.0, adding a cell extract contining an enzyme prepared from the mold aspergillus oryzae, incubating at a temperature between 25° C. and 50° C. for a period of several hours and removing any solid precipitate thereby leaving a liquid product containing antidiphtheritic immunizing properties and free from a substantial amount of horse specificity capable of producing anphylactic shock and serum sickness.

4. In the process of manufacture of antiserums, the steps of diluting the antiserum obtained from the blood serum of a horse and acidifying the same to bring the pH within a range of 4.0 to 7.0, adding a cell extract containing an enzyme prepared from the mold aspergillus oryzae, incubating at a temperature between 25° C. and 50° C. for a period of several hours and removing any solid precipitate thereby leaving a liquid product containing an antiserum having immunizing properties and free from a substantial amount of horse specificity capable of producing anaphylactic shock and serum sickness.

5. In a process for the manufacture of an antiserum, the step comprising digesting an antiserum obtained from an animal organism with an enzyme of the type obtainable from aspergillus oryzae, at an acid pH and a temperature below about 50° C. for a period of time sufficient to destroy the specificity of the organism from which the antiserum was obtained, without substantial destruction of the immunizing power of the antiserum, thereby obtaining a product free from a substantial amount of specificity capable of causing anaphylactic shock.

ROBERT D. COGHILL.